United States Patent [19]

Wiener

[11] 4,387,374
[45] Jun. 7, 1983

[54] RANGE MARK POSITION CONTROL EMPLOYING OPTICAL ENCODING

[75] Inventor: Alan I. Wiener, Lexington, Mass.

[73] Assignee: Raytheon Company, Lexington, Mass.

[21] Appl. No.: 175,176

[22] Filed: Aug. 4, 1980

Related U.S. Application Data

[63] Continuation of Ser. No. 932,876, Aug. 11, 1978, abandoned, which is a continuation of Ser. No. 782,665, Mar. 30, 1977, abandoned.

[51] Int. Cl.³ .................. H03K 13/02; G01S 7/22
[52] U.S. Cl. ..................... 343/5 EM; 340/347 P; 340/347 M; 250/231 SE
[58] Field of Search ............ 340/347 M, 347 P; 343/5 EM; 250/231 SE

[56] References Cited

U.S. PATENT DOCUMENTS

| | | | |
|---|---|---|---|
| 2,656,106 | 10/1953 | Stabler | 340/347 P |
| 2,896,845 | 7/1959 | Hansen et al. | 340/347 DD X |
| 2,921,204 | 1/1960 | Hastings et al. | 340/347 P X |
| 3,646,557 | 2/1972 | Scheer | 343/5 EM X |
| 3,881,176 | 4/1975 | Scheer | 343/5 EM |
| 3,963,919 | 6/1976 | Sells | 340/347 P X |
| 4,015,253 | 3/1977 | Goldstein | 340/347 P |
| 4,077,037 | 2/1978 | Bryden | 343/5 EM |
| 4,125,834 | 11/1978 | Pease | 343/5 EM |

*Primary Examiner*—T. J. Sloyan
*Attorney, Agent, or Firm*—William R. Clark; Joseph D. Pannone; Herbert W. Arnold

[57] ABSTRACT

An optical encoder device for use with a variable range mark display. An operator rotatable cylindrically shaped encoder wheel with longitudinal slits is panel mounted. Two light-emitting diodes are positioned outside the wheel opposite two phototransistors located inside the wheel. The light-emitting diode-phototransistor pairs are spaced at a forty-five degree angle from one another from the center of the wheel. Rotation of the wheel interrupts the light path between the light-emitting diodes and phototransistors producing two output signals. For one direction of rotation the first signal leads the second while for the other direction of rotation the first lags the second. A circuit is disclosed which determines from the output signals the direction of rotation and produces a count indicative of the amount of rotation.

15 Claims, 9 Drawing Figures

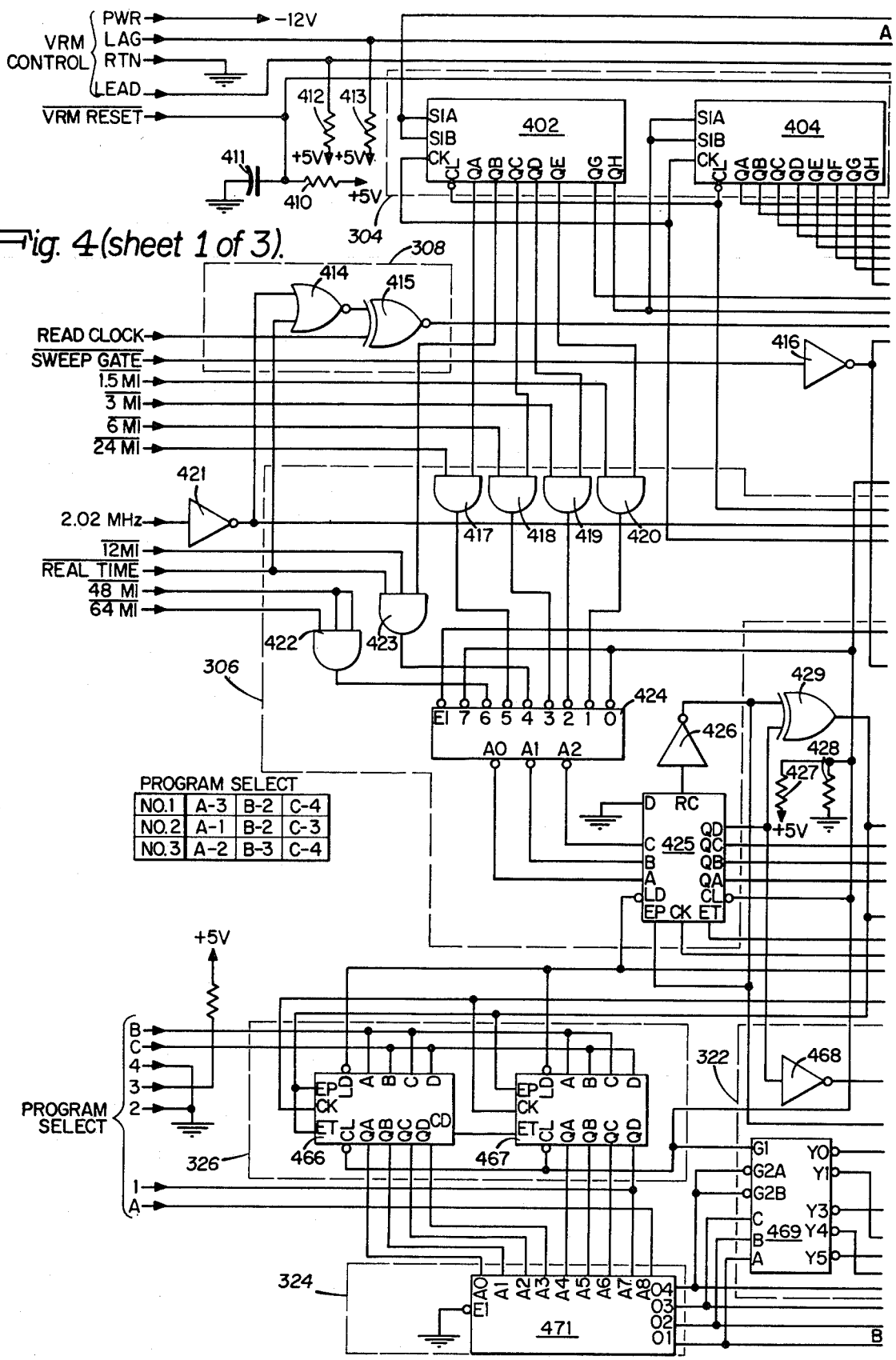
Fig. 4 (sheet 1 of 3).

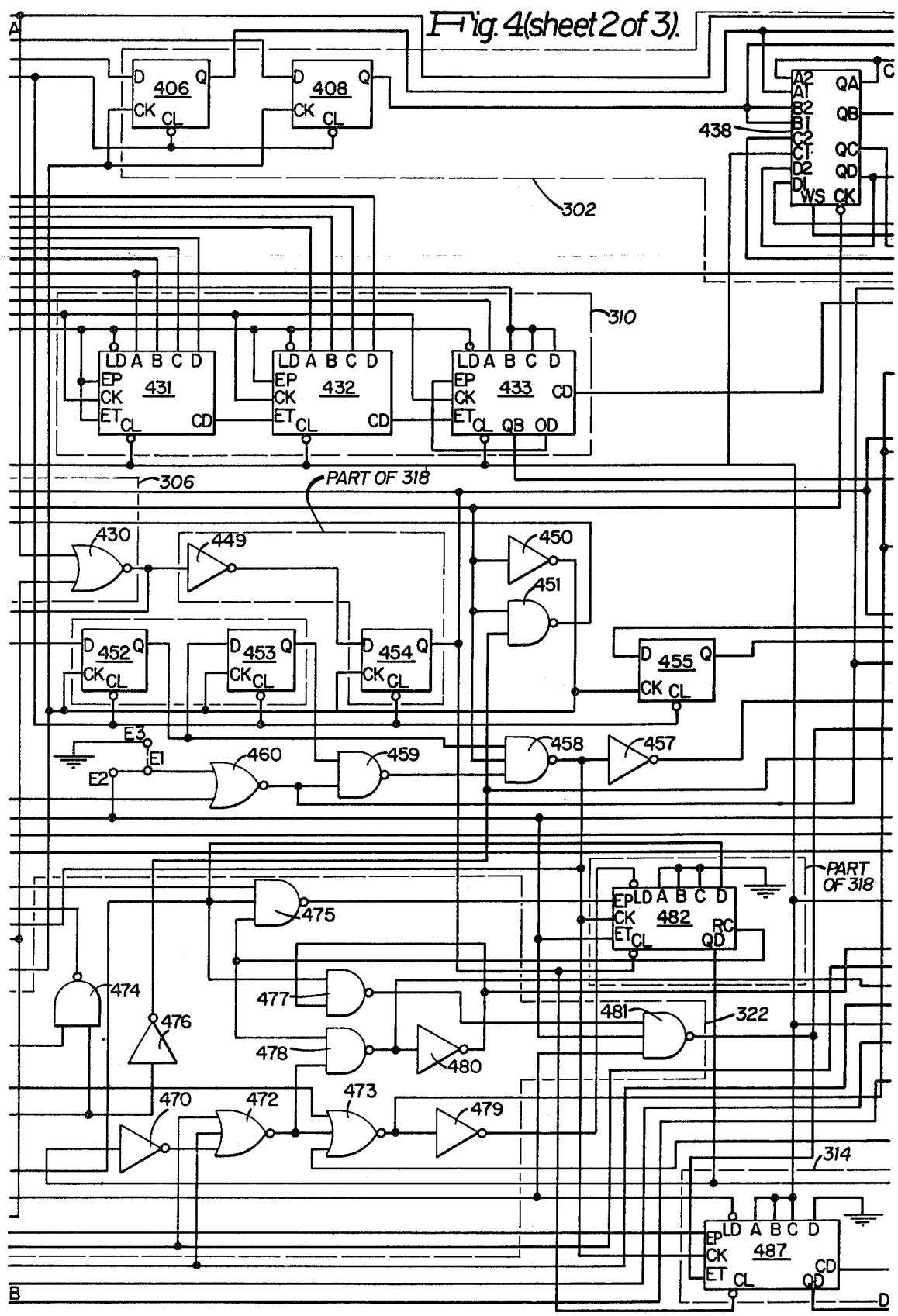
Fig. 4 (sheet 2 of 3).

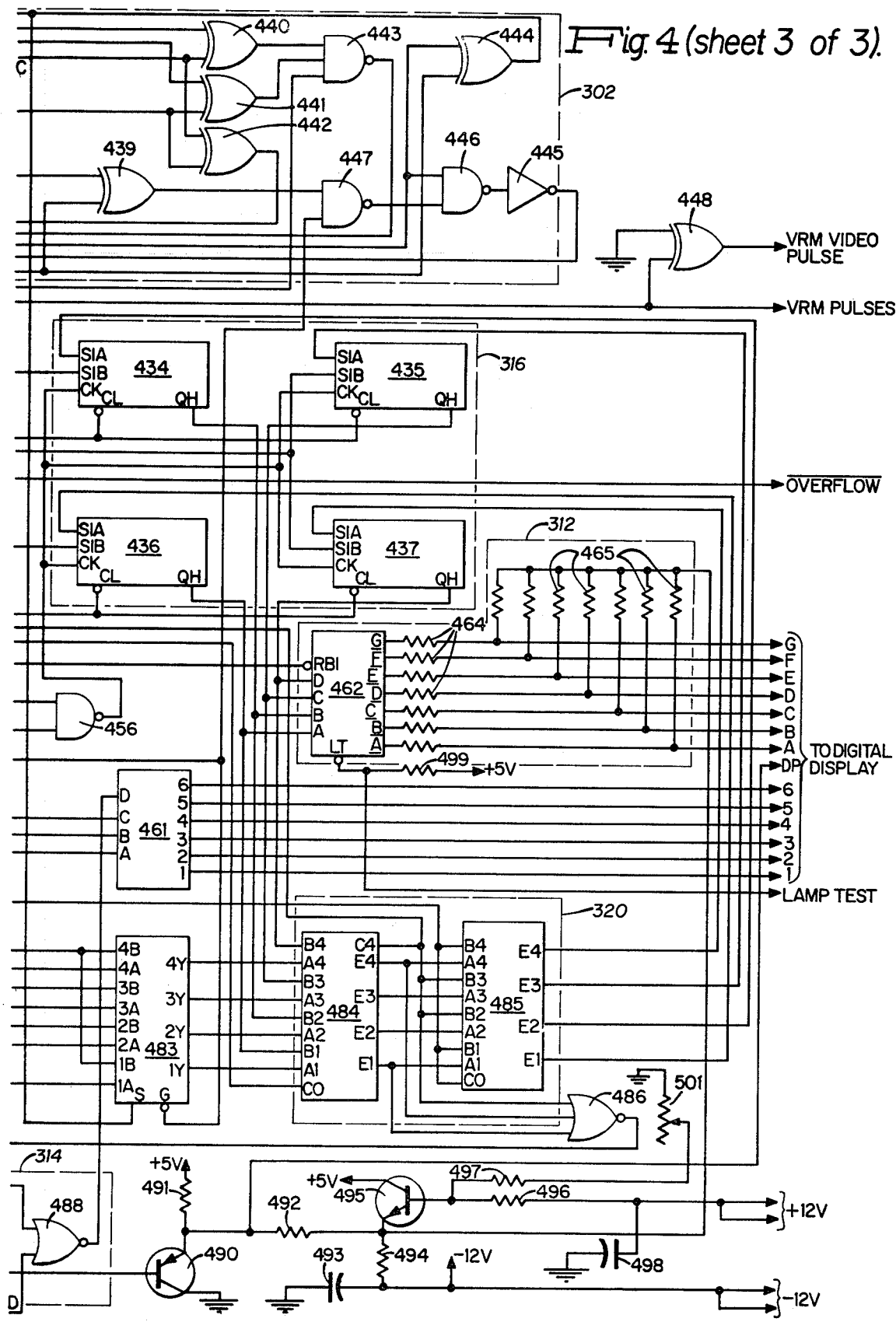

FIG. 7

| $O_4\ O_3\ O_2\ O_1$ | INSTRUCTION |
|---|---|
| 0 0 0 0 | SHIFT RANGE REGISTER |
| 0 0 0 1 | SET SIGNIFICANT DIGIT |
| 0 0 1 0 | RIGHT JUSTIFY DECIMAL |
| 0 0 1 1 | ROUND OFF TO LSD |
| 0 1 0 0 | SET SIGNIFICANT DECIMAL |
| 0 1 0 1 | START DIGITAL DISPLAY |
| 0 1 1 0 | ADD ZERO TO ACCUMULATOR |
| 0 1 1 1 | ADD ONE TO ACCUMULATOR |
| 1 0 0 0 | ADD TWO TO ACCUMULATOR |
| 1 0 0 1 | ADD THREE TO ACCUMULATOR |
| 1 0 1 0 | ADD FOUR TO ACCUMULATOR |
| 1 0 1 1 | ADD FIVE TO ACCUMULATOR |
| 1 1 0 0 | ADD SIX TO ACCUMULATOR |
| 1 1 0 1 | ADD SEVEN TO ACCUMULATOR |
| 1 1 1 0 | ADD EIGHT TO ACCUMULATOR |
| 1 1 1 1 | ADD NINE TO ACCUMULATOR |

FIG. 8

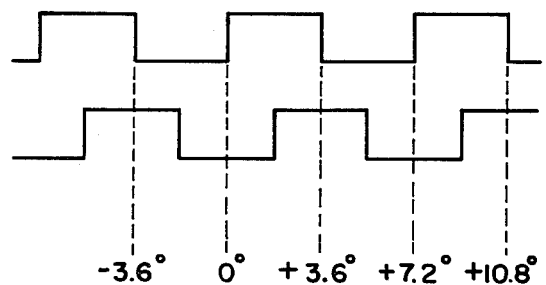

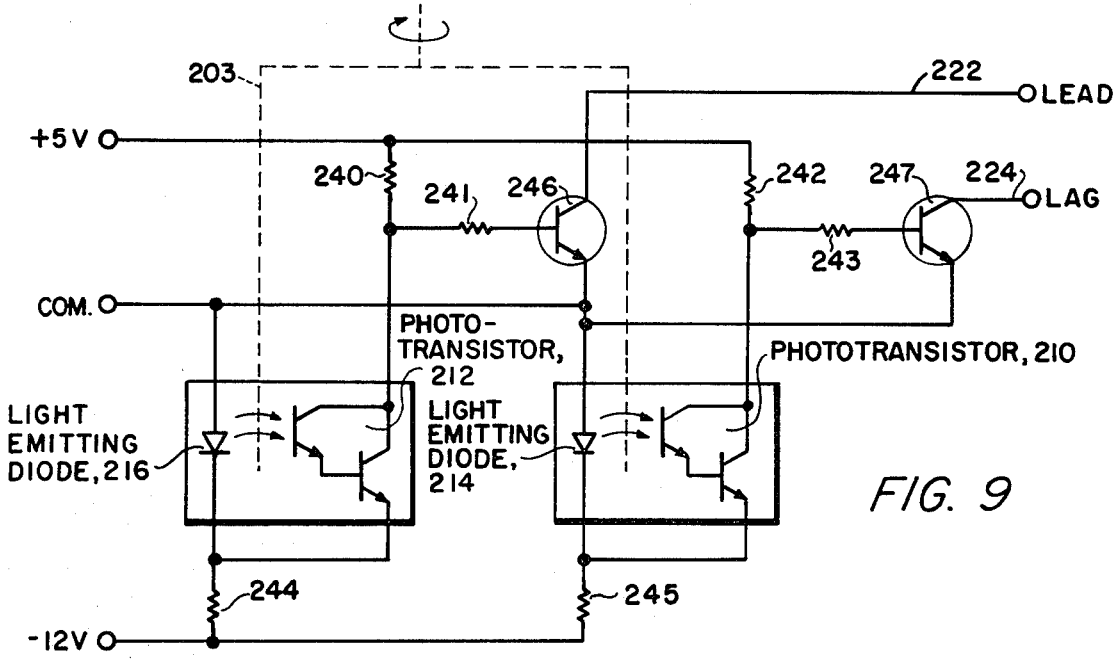

FIG. 9

RANGE MARK POSITION CONTROL EMPLOYING OPTICAL ENCODING

CROSS-REFERENCE TO RELATED CASES

This is a continuation of application Ser. No. 932,876, filed Aug. 11, 1978, abandoned, which is a continuation of application Ser. No. 782,665, filed Mar. 30, 1977 (now abandoned).

BACKGROUND OF THE INVENTION

1. Field of the Invention

The invention relates generally to an optical encoding device for use in an operator-positionable variable range mark circuit for a radar display. Such a range mark is used by an operator to determine the distance from the radar zero position to the selected target upon which the range mark is positioned.

2. Description of the Prior Art

Previous radar systems which employed a variable range ring operated primarily using analog signal processing in the PPI mode. Received radar signals were displayed at substantially the same rate at which they were received. Such systems worked reasonably well at longer ranges in which the writing rate upon the cathode ray tube screen of the display device of the radar system was sufficiently slow to produce an acceptably high brightness level. Also, for the time periods ordinarily involved in the longer ranges, the range to a target could be determined with a generally sufficient amount of precision. However, for short ranges, the writing rate of the cathode ray tube beam became unacceptably high so that the brightness level was reduced down to unacceptably low levels. Moreover, it became more and more difficult to accurately measure the distance to a target as the range decreased because of the short time periods involved.

In systems employing analog signal processing, the range mark signal was generated as the output of a timer. The position of the range mark upon the screen of the CRT was determined by the timing constant of an R-C circuit coupled to the timer used to set the time between activation of the timer and pulse output. Most frequently, a potentiometer, used for the resistance, was the operator control used to move the range mark. With this system, a given angle of rotation of the potentiometer moved the range mark on the screen by varying amounts depending on the range scale setting. On the shorter ranges, the range mark moved a relatively large amount for a small potentiometer rotation, while the same rotation would be hardly perceptible on the longest ranges.

SUMMARY OF THE INVENTION

Accordingly, it is an object of the present invention to provide a device for varying the position of a range mark upon a visual display.

Also, it is an object of the present invention to provide an optical encoder device for producing pulsed signals representing the direction as well as amount of rotation of an operator actuable control shaft.

It is further an object of the invention to provide such an optical encoder device particularly adapted for use for positioning a variable range mark upon a visual display.

These, as well as other objects of the invention, are met by providing an optical encoder device having an encoder wheel with a plurality of substantially parallel slots in a cylindrically shaped peripheral position. An end cap closed one end of the cylinder and a rotatable shaft is attached to the end cap. Twice an odd number of slots are provided. Light-emitting means such as light-emitting diodes are positioned adjacent the outer surface of the peripheral portion of the encoder wheel with the emitted light directed toward the center axis of the wheel through the slots. Light-detecting devices for producing electrical signals such as phototransistors are positioned within the wheel opposite the light-emitting means. As the wheel is rotated, the light path between the light source and the light detectors is alternately blocked and opened. Hence, as the wheel is rotated, output signals are produced by the detectors. One pulse is produced by each detector for each passing slot. The detectors are positioned relative to the slots such that the output signals are out of phase with one another. Preferably, two detectors are provided positioned so that their output signals are 180° out of phase with one another relative to the angular position of the wheel. Forty-five degrees is the preferred angle formed with the longitudinal axis of the wheel between the detectors.

Circuitry is provided for processing the detector outputs to produce a digital number representing the amount of rotation of the encoder wheel. Amplifiers coupled to the detector outputs bring the output signals up to a level sufficient for operating digital circuitry. The direction of rotation is sensed from the amplified detector output signals by a circuit including a plurality or exclusive-OR gates. A counter, which may be an UP/DOWN binary counter, is incremented for one direction of rotation and decremented for the other direction of rotation. The output count is in proportion to the amount of rotation of the encoder wheel.

BRIEF DESCRIPTION OF THE DRAWINGS

FIG. 4 (3 sheets) is a schematic diagram of a preferred implementation of the variable range mark circuit of FIG. 3;

FIG. 7 is a table showing instructions and accompanying codes used with the variable range mark circuit;

FIG. 8 shows two output waveforms from the optical resolver of FIG. 5; and

FIG. 9 is a schematic diagram of the optical transmitting and receiving devices and accompanying circuitry of the optical resolver of FIG. 5.

DESCRIPTION OF THE PREFERRED EMBODIMENTS

Figure 1:
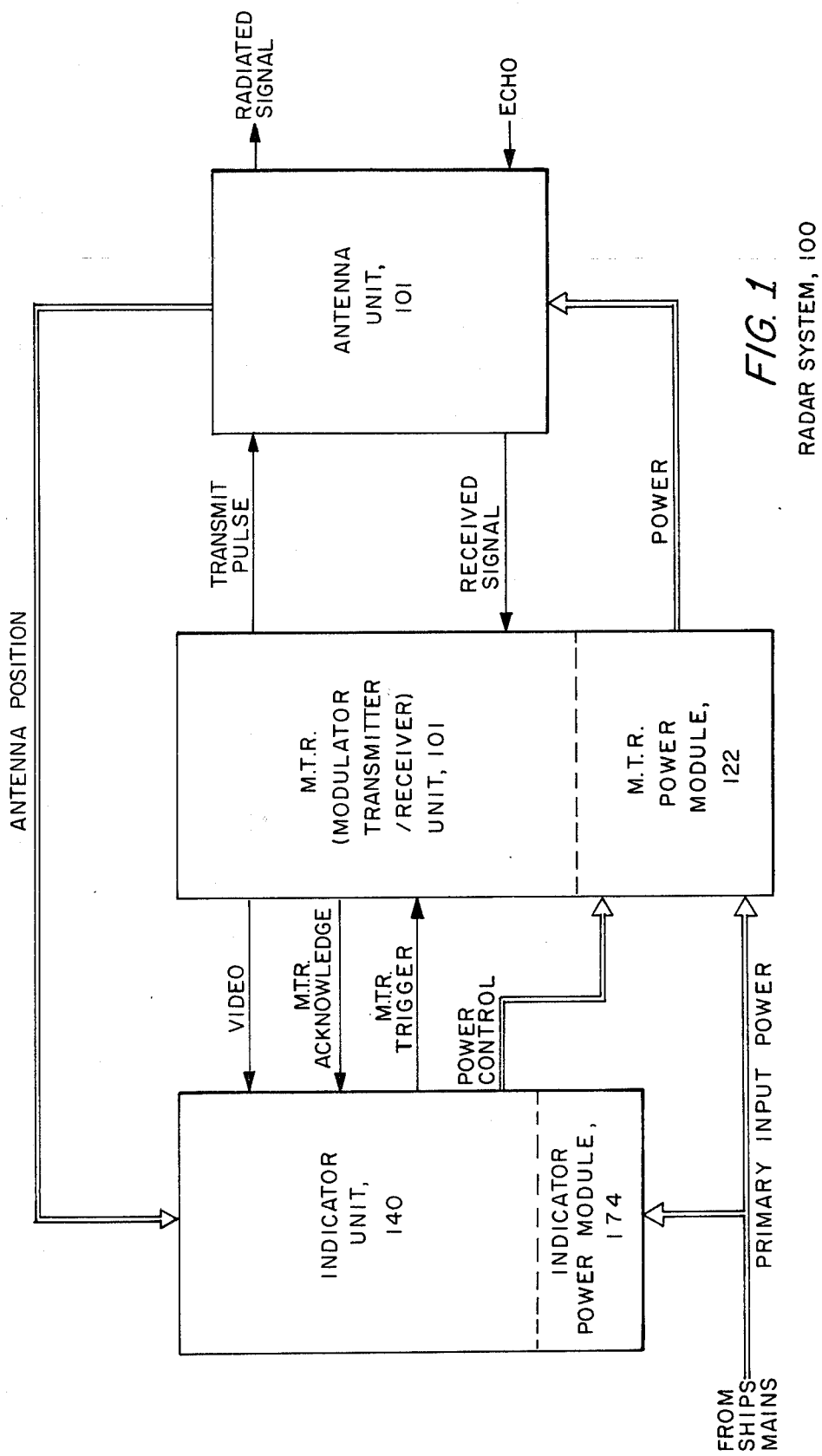
FIG. 1 is a basic block diagram of a radar system of the invention.

Referring first to FIG. 1, there is shown a basic block diagram of a PPI radar system constructed in accordance with the teachings of the present invention. The radar system is constructed from three basic units: indicator unit 140, MTR (modulator-transmitter-receiver) unit 102, and antenna unit 101. Indicator unit 140, which provides the display of radar information and contains the operating controls of the system, is ordinarily mounted upon the bridge of the ship for easy access and convenience for use in navigation. Antenna unit 101 is in practice mounted as high as possible with an unobstructed path for the antenna beam to maximize the range of the unit. MTR unit 102 is located in weather-tight position as close as is practical to antenna unit 101 to minimize losses in the high-power transmit pulses coupled to antenna unit 101 and the low-level receive signals coupled from antenna unit 101 to MTR unit 102.

Both indicator unit 140 and MTR unit 102 contain separate power modules 174 and 122 respectively. Both take the ship's power which may be 110 volts AC 60 cycles or any other normally provided primary input power source and convert it to DC voltages suitable for operating the various electronic circuits and electromechanical devices located within the two units. Additionally, MTR power module 122 supplies operating power to antenna 101 to the motor contained therein for rotation of the antenna. By providing separate power modules in each of the two remotely located major operating units, losses which occurred in previous units in the cabling between units is avoided. Moreover, with the system of the present invention, ON/OFF control of MTR power module 122 is accomplished from indicator unit 140 using only low signal level control voltages. Full control is therefore maintained at the indicator unit without large amounts of power dissipation and loss in long runs of cabling between units.

Each radar pulse cycle is initiated at indicator unit 140 by the production of a MTR TRIGGER pulse which is coupled to MTR unit 102. Upon receipt of this pulse, MTR unit 102 produces a high-power transmit pulse. The transmit pulse is coupled to antenna unit 101 which radiates the signal outward in a narrow beam. Echo return signals from targets are received at antenna unit 101 and relayed to the receiver portion of MTR unit 102. The receiver portion of MTR unit 102 amplifies and detects the received echo signals and produces a video signal to indicator unit 140. The commencement of the video signal is marked by an acknowledge pulse generated within MTR unit 102. Indicator unit 140 produces a visual display of the signals reflected back from targets in the path of the radar beam in accordance with the video signal. The azimuthal position of the radar antenna is relayed from antenna unit 101 directly to antenna unit 140 to indicate the angle upon the display screen the returned radar signals are to be displayed.

Figure 2:
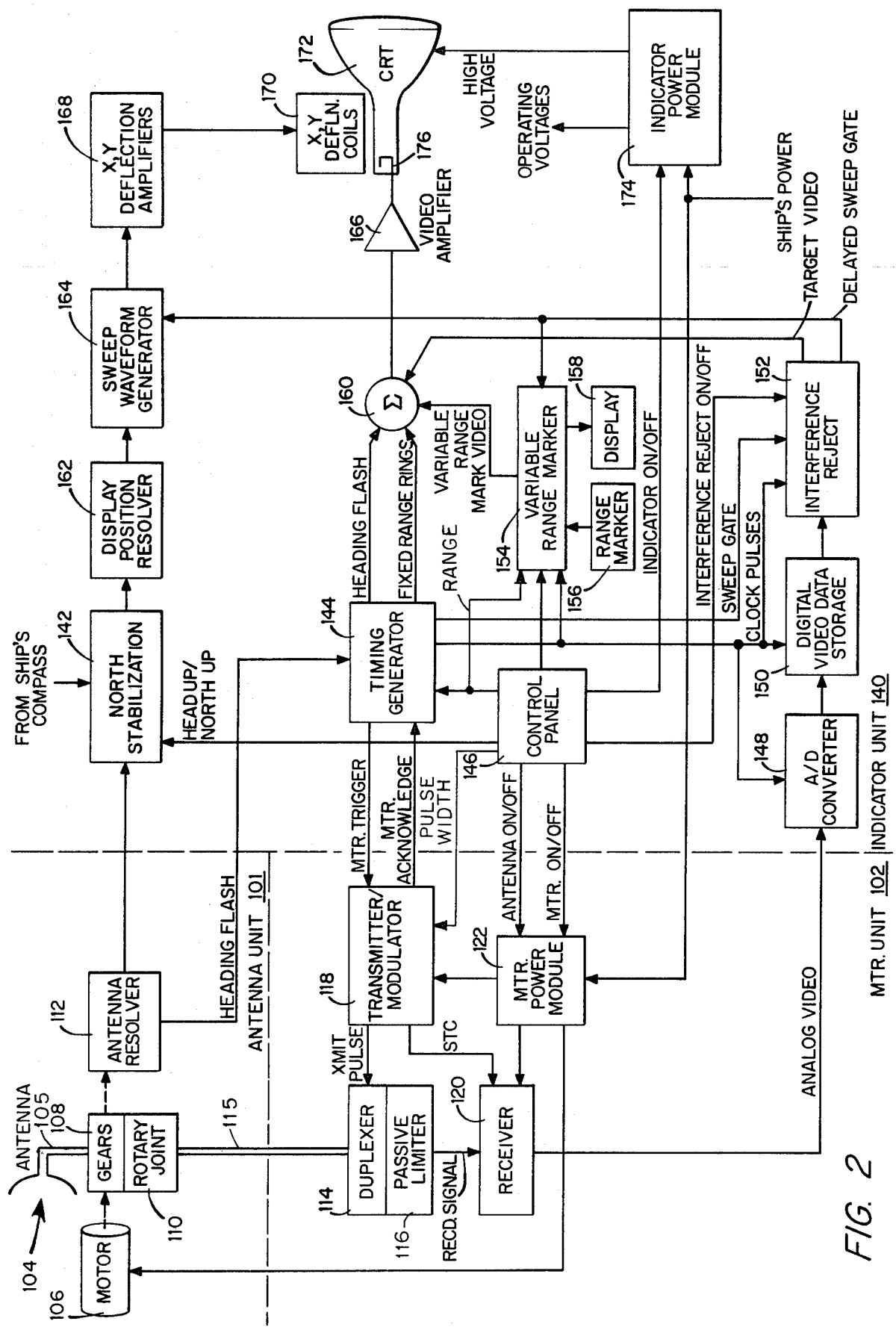
FIG. 2 is a detailed block diagram of a radar system of the invention.

Referring next to FIG. 2, there is shown a detailed block diagram of radar system 100 as shown in FIG. 1. Antenna unit 101 contains a rotatable antenna 104 capable of radiating and receiving signals within the frequency range of the radar pulses. Antenna 104 is rotatably connected to a set of gears 108 through a section of waveguide 105. Motor 106 is mechanically linked to antenna 104 through gears 108 and causes antenna 104 to rotate at a substantially constant and predetermined rate. Antenna resolver 112 is also linked through its input rotary shaft to gears 108 and antenna 104. Its input shaft is rotated preferably at the same rate as antenna 104.

Signals going to and coming from antenna 104 are coupled through rotary joint 110 within antenna unit 101 through waveguide section 115 to duplexer 114. Receive signals are passed through duplexer 114 to passive limiter 116 to the input of receiver 120. Duplexer 114 isolates the transmit pulses produced by transmitter-modulator 118 from receiver 120 and couples the receive signals directly from waveguide 115 to the input of receiver 120 without substantial loss. Passive limiter 116 provides an absolute amplitude limit upon input signals to protect the input circuitry of receiver 120 from being overloaded from signals picked up from nearby radar transmitters.

Transmitter-modulator 118 produces radar pulses in response to an input trigger signal from timing generator 144 within indicator unit 140. The PRF (pulse repetition frequency) of the transmitted radar pulses is entirely determined by the repetition rate of the MTR trigger signal produced by timing generator 144. In previous radar systems in which the PRF was a function of the radar range setting, a plurality of signals indicative of the various possible range settings was coupled to the transmitter-modulator. A decoding circuit then determined the appropriate PRF for the range chosen. With the present system however, only a single trigger signal need be provided.

The width of pulses transmitted may also be a function of the radar range scale setting. It may, for example, be desirable to use a narrower pulse on shorter range scales in order to obtain a greater definition than would be possible using the longer pulses necessary to achieve an acceptable signal-to-noise ratio on the longer ranges. However, it has been found not necessary to provide a different pulse width for every possible range setting value. For example, in the preferred system embodiment of the invention there are 10 different range settings between 0.25 and 64 nautical miles. It has been found that only three different pulse widths of approximately 60, 500, and 1000 nanoseconds are practically required. Only a two bit digital signal then need be coupled between timing generator 144 and transmitter-modulator 118 to select among the three pulse widths. As there are many fewer pulse widths required than are range scale values selectable, many fewer lines or signals need be passed between timing generator 144 and transmitter-modulator 113 than were needed in previous systems.

In previous systems a trigger pulse was generated within the MTR unit which was coupled to both the modulator and display circuitry. Because of certain characteristics of the most commonly employed modulators, the delay time between application of a trigger pulse and generation of the actual transmitted pulse may vary. This is especially true between ranges. Because of this unpredictable delay difference targets in previously known radar systems would sometimes be displayed having an inaccurate jagged edge caused by the sweep starting either too early or too late. With the system constructed in accordance with the present invention, this problem has been eliminated.

Transmitter-modulator 118 produces an MTR ACKNOWLEDGE pulse at the commencement of each transmit pulse. This MTR ACKNOWLEDGE pulse coupled to timing generator 144 marks the beginning of the start of the radar sweep for each of the video signal processing circuit within indicator unit 140. Because the MTR ACKNOWLEDGE pulse is precisely aligned with the commencement of each radar pulse registration between adjacent sweep lines upon the displace screen is maintained to a high precision. Thus, the actual shapes of targets are accurately presented with no jagged edges caused by imprecise synchronization of the start of the display sweep with the actual transmitted pulse.

Transmitter-modulator 188 also produces a sensitivity time control (STC) signal to control the gain within receiver 120. As is well-known in the art, the STC signal is used to vary the gain of receiver 120 during each radar pulse. For signals received from targets nearby the gain is reduced. In this manner the amplifying circuitry within receiver 120 is prevented from being overloaded by the strong signals from nearby targets and locally caused interference and a display having a substantially constant brilliance is produced.

The analog video signal produced at the output of receiver 120 is converted to a serial stream of digital data by analog/digital converter 148 within indicator unit 140. The rate at which samples are taken of the analog video signal for digitization and the length of the time period from the start of the radar pulse during which the analog video signal is digitized is dependent upon the radar range scale setting. For the shorter ranges, a higher sampling rate and shorter time period are used.

The digitized video signal is read into digital video data storage memory 150 under control of clock pulses from timing generator 144. Digital video data storage memory 150 stores the digitized video signal from an entire radar pulse time period. The range to which the signal is stored is of course dependent of the range scale setting. The digital video signal is read out of digital video data storage memory 150 for display upon cathode-ray tube 172 in a second time period also determined by the rate of clock pulses coming from timing generator 144. The second time period may be greater than or less than or the same as the first time period during which the video signal was read into digital video data storage memory 150. Read out occurs preferably immediately following the first time period and before commencement of the next succeeding radar time period. In preferred embodiments, the second time period is substantially constant and independent of the first time period. In this manner, with the constant read-out time period the writing or deflection rate of the beam of cathode-ray tube 172 is also constant so that the display produced is of constant intensity independent of the radar range scale setting. For short ranges, the second time period during which the digital signals are read out from digital video data storage memory 150 and displayed is substantially greater than the time period during which the signals were read in. Because of the increase in time period, the writing rate of the beam of the cathode ray tube 172 is decreased over that which would be required should the video signal be displayed at the same rate at which it is received. Hence, the brightness of the display upon short ranges is greatly increased over that of previously known systems. The preferred manner of video signal digitization, storage, and read out is described in United States patent application Ser. No. 612,882 filed Sept. 12, 1975 and assigned to the present assignee, the specification of which is herein incorporated by reference.

Interference rejection circuit 152 is provided to nullify the interference effects caused by nearby radar transmitters operating within the same frequency band. This type of interference, caused by reception of the transmitted pulses from the nearby radar, appears as plural spiral arms radiating outward from the center of the radar presentation. Interference rejection circuit 152 operates to substantially cancel this type of interference from the radar presentation without substantially effecting the presentation of desired targets. A switch is located upon control panel 146 which permits the operator to turn interference rejection circuit 152 ON and OFF as desired. The details of the construction of interference rejection circuit 152 are contained in copending application Ser. No. 714,171, filed Aug. 13, 1976, the specification of which is herein incorporated by reference. The final video output signal produced at the output of interference rejection circuit 152 is coupled to video amplifier 166 via video signal summer 160.

Also provided is variable range marker circuit 154. Variable range marker circuit 154 produces an output video signal in the form of a short pulse for each to display a circular range ring mark at a distance from the center of the radar display determined by the setting of range marker adjustment 156. Range marker adjustment 156 may physically be a part of control panel 146. A display device 158 provides a digital read out to the operator of the distance from the radar antenna to the target upon which the variable range mark is positioned. The output variable range mark video signal from variable range mark circuit 154 is coupled to video amplifier 166 through video signal summer 160.

Timing generator 144 furnishes clock and other timing signals used for the various circuits within indicator unit 140. An internal oscillator within timing generator 144 produces the clock pulses at predetermined periods. The heading flash from antenna resolver 112 which is produced each time the antenna beam passes the forward direction of the ship is reclocked by the clock pulses produced by the oscillator within timing generator 144 and coupled as a video pulse through video signal summer 160 to video amplifier 166 to produce a mark on the screen to indicate to the operator when the antenna beam so passes the bow of the ship. Timing generator 144 also produces the MTR TRIGGER signal as a pulse at predetermined fixed intervals depending upon the radar range scale setting as relayed from control panel 146. The MTR ACKNOWLEDGE signal from transmitter-modulator 118 is used by timing generator 144 to produce a SWEEP GATE signal which is a logic signal which assumes the high or active state in the time period during which video signals are being received. The SWEEP GATE signal is set in the active state as soon as the MTR ACKNOWLEDGE signal is received and set to the low or inactive state at the end of the time period depending upon the range setting selected.

Upon control panel 146 are mounted the various operator actuable controls for adjusting and determining the operation of the various circuits within the radar system. A range control is provided that determines the maximum range at which targets are to be displayed. This distance corresponds to the distance at the edge of the cathode ray tube screen. ON/OFF switches are provided for operating MTR power module 122, motor 106 of antenna 101 via MTR power module 112, interference rejection circuit 152, variable range marker circuit 154, and indicator power module 174. A switch is provided to select between head up (the direction in which the ship is pointing) or north up at the top of the display presentation.

For generating displays in which north rather than the current ship's heading is represented at the top of the display screen, north stabilization circuit 142 modifies the signals received from antenna resolver 112 before coupling them to display position resolver 162. Otherwise, for displays in which the ship's heading is displayed at the top of the screen, the signals from antenna resolver 112 are coupled directly to display position resolver 162. Display position resolver 162 takes the output signals from either antenna resolver 112 or north stabilization circuit 142 in the form of dulated sine and cosine waveforms and produces therefrom DC voltages for each radar sweep representing X and Y sweep increments. Sweep waveform generator 164 produces X and Y ramp waveforms, the maximum amplitudes of which are determined by the DC voltages from display position resolver 162. Generation of the two ramp waveforms commences at the time marked by the beginning of the DELAYED SWEEP GATE signal from interference rejection circuit 152 which in turn was produced by delaying the SWEEP GATE signal from timing generator 144 by one or more clock periods to permit interference rejection circuit 152 to perform its operation. The X and Y ramp waveforms are each coupled to X and Y deflection amplifiers 168 where they are amplified and coupled to X and Y deflection coils 170 for deflecting the beam of cathode ray tube 172 in the manner well-known in the art. The output of video amplifier 166 is coupled to cathode 176 of cathode ray tube 172 for modulating the beam intensity thereof.

The high voltage applied to the accelerating anode of cathode-ray tube 172 and all other operating voltages for the various circuits within indicator unit 140 including the voltages for biasing and operating all the logic circuits contained therein are provided by indicator power module 174. Indicator power module 174 is, as is MTR power module 122, preferably a switching power supply capable of producing at its output a plurality of voltages having the required current furnishing capabilities. The switching frequency of indicator power module 174 and that of MTR power 122 are selected intermediate the PRF rate as determined by timing generator 144 in accordance with the range setting and the rate of digitization of the analog video signal by analog/digital converter 148. By operating the power modules at a switching rate intermediate the PRF and digitization rates, interference effects are eliminated.

Figure 3:
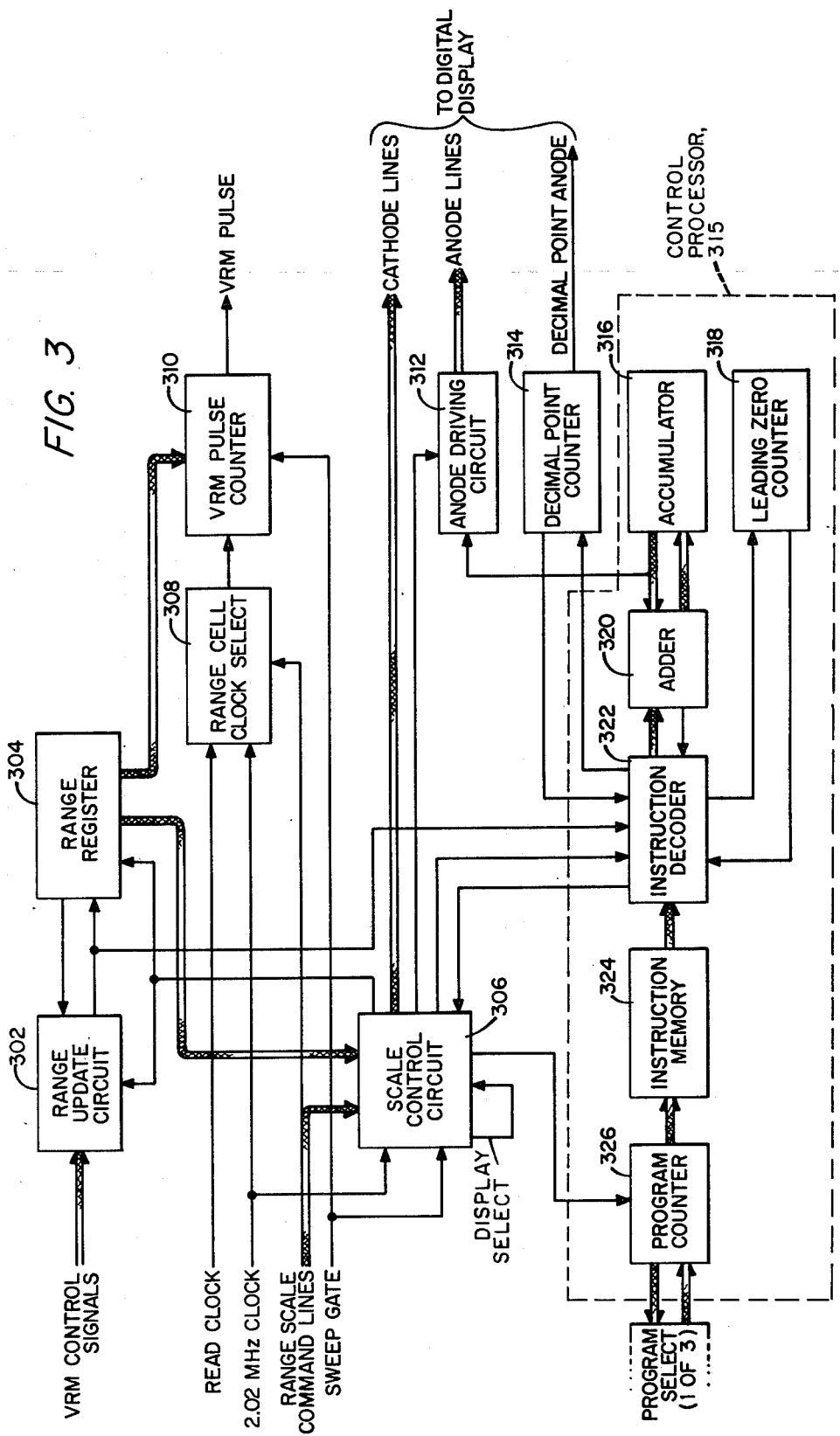
FIG. 3 is a block diagram of the variable range mark circuit of the radar system shown in FIG. 2.
Figure 5:
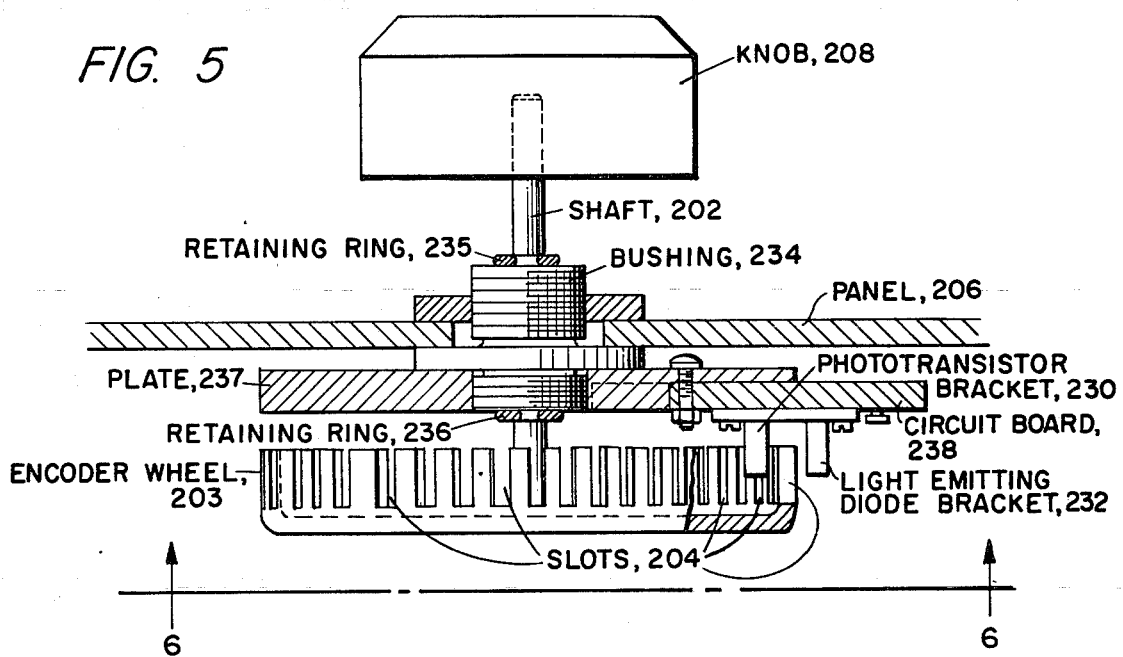
FIG. 5 is a cross-sectional view of an optical resolver contructed in accordance with the invention.

Referring next to the block diagram of FIG. 3, the schematic diagram of FIG. 4, and the electro-mechanical drawings of FIGS. 5 and 6, the operation of variable range marker (VRM) circuit 154 will be described. Variable range marker circuit 154 provides a variable range mark video signal one range cell wide at a range position which is selected by VRM range adjust control 156. The corresponding value of the range distance in one of, in the example of the preferred embodiment, three alternative selective dimensions (nautical miles, and yards) may be read on a three or six digit LED display 158 in preferred embodiments which may be located near the top of the face of the screen of CRT 172 upon control panel 146. The three digit display is used for miles while the six digit display is used for yards or meters.

The VRM range mark position is determined by the value stored in 16 bit range register 304 (registers 402 and 404). Fifteen of these sixteen bits provide nine bits of resolution (512 range cells) for each of 7 contiguous binary range scale factors in the preferred embodiment. The sixteenth bit provides a "VRM-OFF" indication. Registers 402 and 404 are parallel entry registers with serial shift capabilities.

For the majority of the operational time of this circuit, the concepts of range register 304 are in a circularly shifted condition with the last bit position of the shift register coupled to the first bit serial input through exclusive OR gate 444 within range update circuit 302. The bit corresponding to one range cell of the selected range scale is located at the LSB end of the register.

The nine bits at the LSB end of range register 304 are used to control VRM pulse counter 310 (binary counters 431–433). Between sweep gate signals, VRM pulse counter 310 is preset to the complement of the count values represented by these bits. During the active state of the SWEEP GATE signal, VRM pulse counter 310 is incremented by one bit count for each range cell as displayed upon CRT 172 as indicated by each READ CLOCK pulse. When VRM pulse counter 310 reaches a count value of 511, a VRM video pulse is produced. Upon the next READ CLOCK pulse, the VRM pulse counter 310 advances to a count of 512 at which it remains until the end of the active state of the SWEEP GATE signal for that radar pulse.

If the range value contained in range register 304 is greater than 511 range cells of the selected range scale, an overflow condition will be indicated by the activation of the tenth significant bit position of range register 304. When VRM pulse counter 310 is preset to an overflow condition, as may happen when the system is first activated or if the range mark is positioned off scale, VRM pulse counter 310 will remain in the state to which it was preset for the duration of the SWEEP GATE signal and no VRM video pulse will be produced.

The value initially stored in range register 304 to set the position of the range mark is changed by means of two VRM control signals LEAD and LAG. These two signals are generated by the optical resolver device of the invention shown in the views of FIGS. 5 and 6. Cylindrically shaped resolver encoder wheel 203 is coupled through shaft 202 to operator rotatable knob 208 upon control panel 206. Shaft 202 is held in position by bushing 234. Retaining rings 235 and 236 prevent translational motion of shaft 202 within bushing 234. Shaft 202 and encoder wheel 203 may be formed for economy as a single plastic component.

Along the periphery of encoder wheel 203 are located a number of longitudinal slots 204 cut through the cylindrical outer surface of encoder wheel with the slots having preferably the same width as the space between slots. Twice an odd number of slots are provided such as fifty in the preferred embodiment.

Figure 6:
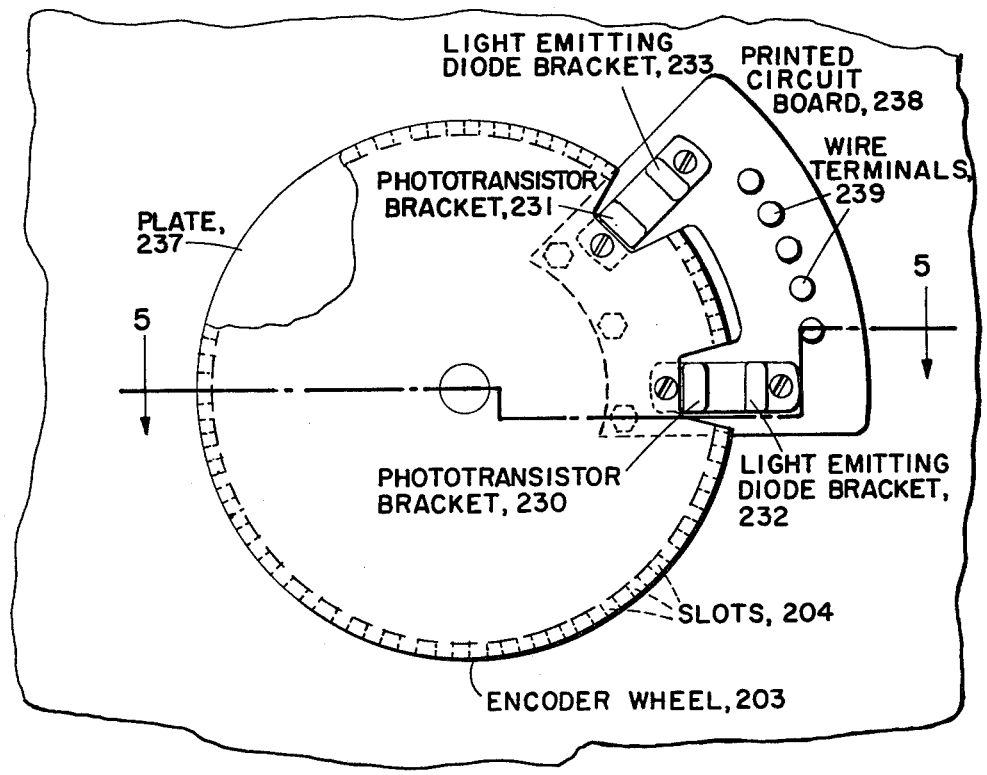
FIG. 6 is a bottom view of the optical resolver shown in FIG. 5.

Mechanical support for light-emitting diodes and corresponding phototransistors is furnished by brackets 230–233 as shown in FIG. 6. Printed circuit board 238, containing the circuitry shown in FIG. 9 is mounted upon retaining plate 237. Brackets 230–233 are in turn mounted upon printed circuit board 238. Wire terminals are provided for external connection. Location of the phototransistors inside of encoder wheel 203 protects against unwanted activation due to stray light within the display cabinet.

Referring next to the schematic diagram of FIG. 9, current furnished light-emitting diodes 214 and 216 through resistors 244 and 245 cause light-emitting diodes 214 and 216 to continuously emit light toward Darlington-pair phototransistors 210 and 212 located on the inside of encoder wheel 203. Light-emitting diodes 214 and 216 are positioned outside housing 203 forming an angle between them with the center of encoder wheel 203 of forty-five degrees. With this positioning and with twice an odd number of slots in encoder wheel 203, the device is capable of producing output signals, herein labled LEAD and LAG, indicative of both amount and direction of rotation.

The LEAD and LAG signals are produced upon the collectors of the respective phototransistors 210 and 212. The signals upon the collectors of phototransistors 210 and 212 are coupled through resistors 243 and 241 to the bases of transistors 247 and 246 respectively. These transistors provide final output signal buffering and amplification. Bias is furnished through resistors 240 and 242.

In the preferred embodiment, each one-hundreth of a revolution of control shaft 202 produces an alternate high or low change in level of one of the signals. When the shaft is rotated clockwise, the LEAD signal waveform will be phased in advance of that of the LAG signal while, when shaft 202 is rotated counterclockwise, the LEAD signal waveform will be phased in retard of the LAG signal. This is shown by the waveforms of FIG. 8. Therein, clockwise rotation is indicated for positive angles of rotation and counterclockwise rotation is indicated for negative angles of rotation. Each transistion in one of the signals in the preferred embodiment with fifty slots in the encoder wheel, represents an angle of rotation of ±3.6°.

As stated above, the value stored in range registor 304 is positioned with the bit corresponding to the range cell of the particular range selected at the LSB position of the register which in turn is coupled to the LSB position of VRM pulse counter 310 which is operated at one count per range cell during display time. When the range scale is changed, the binary number stored in range register 304 is shifted to align the appropriate bit in the LSB position. Because of this action, the range mark displayed will stay on a selected target as the range scale is changed and the target changes its relative position on the screen of the display tube. Moreover, also because of the shifting operation, a given amount of rotation of control shaft 202 produces the same distance of movement of the range mark upon the face of the display tube regardless of the range scale selected. Eliminated is the problem of a small rotation producing a large movement on short ranges and very little movement on long ranges.

Range update circuit 302 functions to interpret the relative occurrence of transitions in the LEAD or LAG signals and, as a result, to increase or decrease the value stored in range register 304. A detection is made by range update circuit 302 (flip/flops 406 and 408, multiple input register 438, exclusive-OR gates 439–442 and 444, NAND gates 443, 447 and 446, and inverter 445). The relative occurrence of transitions in the LEAD and LAG signals are used to increase or decrease the value stored in range register 304. When shaft 202 of the optical encoder is rotated in one direction or another, an add or subtract indication is interpreted by the circuit from the signals for each incremental change of shaft position. When the shaft is reversed, the first incremental change is ignored so that the shaft must always rotate by at least one increment of position in either direction to change the value set in range register 304.

A dimension calculation process is initiated at the beginning of every seventh sweep gate signal for a six digit LED display system and for every fourth sweep gate signal for systems using a three digit LED display. The valve changeindication and direction of change is stored in register 438 between dimension calculation processes. During each dimension calculation process, the contents of range register 304 is shifted through range update circuit 302 and returned to range register 304. A serial addition or subtraction is performed by exclusive-OR gate 444 within range update circuit 310. The resultant value, which is again stored in range register 304, will be either increased or decreased by a value corresponding to one range cell for the selected range scale or remain unchanged if no change indication has occurred since the last dimension calculation process. Recognition of new change indications is inhibited during each dimension calculation process.

Near the conclusion of the dimension calculation process, the contents of range register 304 is positioned with the least significant bit of the 16 bit value stored therein at the next to the LSB end of the register. At this time, the range scale lines (1.5 mile-64 miles and REAL TIME) are sampled simultaneously with the upper 5 bit positions and the MSB input of range register 306 by AND'ing the signals together with gates 417–420, 422 and 423 to determine the ranges which would have an overflow condition. The AND'ed signals are encoded to 8-line to 3-bit encoder 424 with the encoded result stored in register 425. If it is determined that none of the scales above the one selected have an overflow condition, the selected scale is used. If any of the scales above the one selected have an overflow condition, the highest of these scales is comparable to a "VRM OFF" indication and will result in the disabling of the digital LED display. The scale selection decision registered as the encoded number within register 425 is used by scale control circuit 306 to control the shifting of range register 304 until the bit which corresponds to a value of 1 range cell upon the selected range scale is positioned at the LSB end of range register 304.

Each dimension calculation process is essentially a conversion of the binary values stored in range register 304 to the appropriately scaled decimal value which is to be displayed by digital LED display 158. The conversion is performed by program control processor 315 at a rate determined by an externally supplied 2.02 MHz clock signal.

Program control processor 315 includes program counter 326, instruction memory 324, instruction decoder 322, adders 320 and accumulator registers 316. In the preferred embodiment, three separate programs are provided depending upon the type of final display desired. Three examples are shown in the tables of Appendix I. In the examples, program number 1 is for conversion to yards, program number 2 for conversion to miles, and program number 3 for conversion to meters. However, other programs may be provided as desired. The program selected is determined by the start count jammed into the parallel inputs of program counter 326 (binary counters 466 and 467). This is done by connecting the program select lines labeled A–C to the numbered terminals of the program select inputs as shown in the table at the lower left of FIG. 4. The three programs include a total of 155 4-bit word instructions which are permanently stored in instruction memory 324 which may be a read-only or programmable read-only memory. FIG. 7 is a table specifying for each of the 16 possible binary bit output combinations from instruction memory 324 what operations are to be performed corresponding to each instruction. Each instruction within each of the three programs is accessed from instruction memory 324 by program counter 326. Implementation of the instructions is executed by instruction decoder 322.

The decimal value to be displayed by digital LED display 158 is generated serially with a word-by-word summation and accumulated in the 8-word by 4-bit accumulator 316 (registers 434-437). Each eighth instruction (shift range register instruction) shifts the next bit of the binary value toward the LSB end of range register 304. If the bit indicates a value of one, each of the following instructions in the series will add the appropriate value to the associated word as it is shifted from accumulator 316 through adder 320 and stored back into accumulator 316 through adder 320 and stored back into accumulator 316 upon the next clock pulse. As each decimal carry is generated, it is stored then added to the next higher significant word. If the bit at the LSB end of range register 304 indicates a value of 0, the words passing through the adder have 0 added to them and remain unchanged.

The output of adder 320 is continuously monitored by instruction decoder 322. A count of the last consecutive values of zero is maintained by leading zero counter 318. The last "shift range register" instruction of the sequence will shift the "VRM-OFF" bit to the LSB end of range register 304. This bit normally indicates the presence of a zero.

The next group of instructions, the "set significant digits" instructions, holds the contents of accumulator 316 stationary while increasing the count value in leading zero counter 318 by the number of significant digits of accuracy to be displayed. The zero counter value is limited to 7.

The next group of instructions, the "round off" instructions serve to round off the value in accumulator 316 to plus or minus one-half increment of the least of the selected significant digits. As each word passes from adder 320 back to accumulator 316, it is replaced by a value of zero and the count in leading zero counter 318 decreases until it is equal to 7. At this point, a value of 5 is added to the word on the input of adders 320. The resultant presence or absence of a carry is stored while the word returned to accumulator 312 is replaced by a value of zero.

During the remaining "round off" instructions leading zero counter 318 will carry a count of 8, the carry (if present) will be allowed to propagate, and the resultant summation will be returned to accumulator 316. If the displayed value could contain significant digits to the right of the decimal point, the next eight instructions will be "add zero" instructions. They allow the contents of accumulator 316 to be cycled through adder 320 unchanged to update the count value in leading zero counter 318.

These instructions are followed by the "set significant digits" instructions which essentially halt the accumulator contents while increasing the leading zero count by the number of significant digits of accuracy to be displayed. The latter instructions will each also preset decimal point counter 314 to a count state which places the decimal point to the left of the least significant digit in accumulator 316.

The next set of instructions, the "decimal right justify" instructions, function to drop off the nonsignificant digits to the right of the eventual decimal point position. With each shift of the contents of accumulator 316, the contents in both leading zero counter 318 and decimal point counter 314 are increased by a value of one until the count and leading zero counter 318 is equal to 7. The position of the contents of accumulator 316 and the count of leading zero counter 318 and decimal point counter 314 will then remain unchanged for the remainder of the "decimal right justify" instructions.

The following three sets of instructions cause the contents of accumulator 316 to be cycled through adder 320 unchanged by adding 0's to update the count value in leading zero counter 318. The "set significant decimal" instruction, the first of these three sets, decimal point counter 314 is inhibited from advancing. The effect of this operation is to shift the decimal point to the left with respect to the digits until it is properly positioned. The second of the sets are "add zero" instructions. The third set is a single "start digital display" instruction which also acts as an "add zero" instruction. This instruction presets program counter 326 to the values determined by its preset inputs and also initiates operation of scale control circuit 306.

If the circuit is programmed to always display all significant digits to the left of the decimal point as is the case for yards and meters, another sequence of instructions is used after the last "round off" instruction. First, a "set significant digits" instruction is used to preset decimal point counter 314 to a count state which places the decimal point to the left of the least significant digit in accumulator 316. However, this digit is never displayed. Then, a set of seven "add zero" instructions will occur to update the count value in leading zero counter 318. The final instruction is again the "start digital display" instruction. Once initiated by the "start digital display" instruction the scale control circuit 306 will control the remaining operations of the variable range marker circuits.

As described earlier, the first operation of scale control circuit 306 is to sample the range control lines and associated bit positions of range register 304. This is done by the "start digital display" instructions to determine the scale to be selected. The scale selection decision is then stored in register 425 which also functions as a counting register. If the "VRM-OFF" bit of range register 304 is in the logical 1 state, accumulator 316 is cleared, leading zero counter 318 is set to a count of 8, decimal point counter 314 is set to place the decimal to the left of the least significant digit in accumulator 316, and also 16 bits of range register 304 are set to the one state. If the "VRM-OFF" bit of range register 304 is in the zero state, the contents of accumulator 316, leading zero counter 318, decimal point counter 314, and range register 304 are unaffected. The program counter will continue to be advanced. During this time the position of the contents in accumulator 316 and the counts of leading zero counter 318 and decimal point counter 314 will be inhibited from changing. The position of the contents in range register 304 are changed by each "shift range register" instruction. Each of these instructions is accompanied by addressing counting register 425 within scale control circuit 306.

When the bit which corresponds to a value of one range cell of the selected range scale is positioned at the LSB end of range register 304 as indicated by counting register 425 of scale control circuit 306, program counter 326 is inhibited from further advancement and the segment anode driving of LED display 158 is enabled. At this point, the dimension calculation process has been finished and the display output process was performed using the 2.02 MHz clock, the display output process is operated at the SWEEP GATE signal rate.

At the beginning of each succeeding SWEEP GATE signal, the contents of accumulator 316 are shifted and the counts of leading zero counter 318 and decimal point counter 314 are advance. Zero values are entered at the input stage of accumulator 316. As each digit reaches the output end of accumulator 316 a corresponding seven segment code is produced by anode driving circuit 316 which is decoded by seven segment decoder 462 for driving display lines A–G as would be used in a 6 digit display. At the same time, the common cathode line is selected (display lines 1–6 as selected by decoder 461 within scale control circuit 306). If either leading zero counter 318 indicates a count of less than 8 or decimal point counter 314 indicates that the decimal point is yet to be displayed, the selected cathode line will be activated and the digital display thus eliminated. The decimal point anode (DP) is activated by decimal point counter 314 when the appropriate cathode line is selected and activated. Once leading zero counter 318 reaches a count of 8, digits to the left of the decimal point will be blanked by not activating the selected cathode line. Thus a display is produced with a non-zero digit in the left-most display position with the decimal point appropriately positioned. A three digit display may be produced by using only cathode lines 1–3. In that case, the last three cathode lines are selected at the 2.02 MHz rate resulting in a higher duty cycle for each of the remaining three active digits. The anode driving circuit is disabled when the last three cathode lines are selected.

The next dimension calculation process begins at the end of the selection period of the sixth cathode line. The dimension calculation program is continued from instruction memory 324 at which program counter 326 is previously halted at the 2.02 MHz rate. Selection between 3 and 6 digit displays is also made internally by connecting the upper input of NOR gate 460 marked E1 to the terminal marked E3 in the case of a six digit display and to the terminal marked E2 in the case of a three digit display.

The brightness of the LED display digits is set by adjusting the base drive to transistor 495 by variable resistor 501. The base drive to transistor 495 in turn controls the maximum voltage upon the emitter of transistor 490 and hence the available current through resistors 465 to the LED display device anodes.

This concludes the description of preferred embodiments of the invention. Although preferred embodiments have been described, it is believed that numerous modifications and alterations thereto would be apparent to one having ordinary skill in the art without departing from the spirit and scope of the invention.

APPENDIX I
Nautical Miles

| Address | $O_4O_3O_2O_1$ | Address | $O_4O_3O_2O_1$ |
|---|---|---|---|
| 652 | 0000 | 767 | 0111 |
| 653 | 1011 | 770 | 0110 |
| 654 | 1000 | 771 | 0110 |
| 655 | 0110 | 772 | 0000 |
| 656 | 0110 | 773 | 0110 |
| 657 | 0110 | 774 | 0110 |
| 660 | 0110 | 775 | 1100 |
| 661 | 0110 | 776 | 1011 |
| 662 | 0000 | 777 | 1000 |
| 663 | 0110 | 000 | 0110 |
| 664 | 1011 | 001 | 0110 |
| 665 | 0110 | 002 | 0000 |
| 666 | 0110 | 003 | 0110 |
| 667 | 0110 | 004 | 0110 |
| 670 | 0110 | 005 | 1000 |
| 671 | 0110 | 006 | 0111 |
| 672 | 0000 | 007 | 1011 |
| 673 | 0110 | 010 | 0110 |
| 674 | 0110 | 011 | 0110 |
| 675 | 0111 | 012 | 0000 |
| 676 | 0110 | 013 | 0110 |
| 677 | 0110 | 014 | 0110 |
| 700 | 0110 | 015 | 1010 |
| 701 | 0110 | 016 | 1000 |
| 702 | 0000 | 017 | 0110 |
| 703 | 0110 | 020 | 0111 |
| 704 | 0110 | 021 | 0110 |
| 705 | 1000 | 022 | 0000 |
| 706 | 0110 | 023 | 0110 |
| 707 | 0110 | 024 | 0110 |
| 710 | 0110 | 025 | 1110 |
| 711 | 0110 | 026 | 1010 |
| 712 | 0000 | 027 | 0110 |
| 713 | 0110 | 030 | 1000 |
| 714 | 0110 | 031 | 0110 |
| 715 | 1010 | 032 | 0000 |
| 716 | 0110 | 033 | 0110 |
| 717 | 0110 | 034 | 0110 |
| 720 | 0110 | 035 | 1100 |
| 721 | 0110 | 036 | 1111 |
| 722 | 0000 | 037 | 0110 |
| 723 | 0110 | 040 | 1010 |
| 724 | 0110 | 041 | 0110 |
| 725 | 0110 | 042 | 0000 |
| 726 | 0110 | 043 | 0001 |
| 727 | 0110 | 044 | 0001 |
| 730 | 0110 | 045 | 0001 |
| 731 | 0110 | 046 | 0011 |
| 732 | 0000 | 047 | 0011 |
| 733 | 0110 | 050 | 0011 |
| 734 | 0110 | 051 | 0011 |
| 735 | 1100 | 052 | 0011 |
| 736 | 0111 | 053 | 0011 |
| 737 | 0110 | 054 | 0011 |
| 740 | 0110 | 055 | 0011 |
| 741 | 0110 | 056 | 0110 |
| 742 | 0000 | 057 | 0110 |
| 743 | 0110 | 060 | 0110 |
| 744 | 0110 | 061 | 0110 |
| 745 | 1000 | 062 | 0110 |
| 746 | 1001 | 063 | 0110 |
| 747 | 0110 | 064 | 0110 |
| 750 | 0110 | 065 | 0110 |
| 751 | 0110 | 066 | 0001 |
| 752 | 0000 | 067 | 0001 |
| 753 | 0110 | 070 | 0001 |
| 754 | 0110 | 071 | 0010 |
| 755 | 1010 | 072 | 0010 |
| 756 | 1100 | 073 | 0010 |
| 757 | 0110 | 074 | 0100 |
| 760 | 0110 | 075 | 0100 |
| 761 | 0110 | 076 | 0100 |
| 762 | 0000 | 077 | 0110 |
| 763 | 0110 | 100 | 0110 |
| 764 | 0110 | 101 | 0110 |
| 765 | 1110 | 102 | 0110 |
| 766 | 1000 | 103 | 0101 |

Meters

| Address | $O_4O_3O_2O_1$ | Address | $O_4O_3O_2O_1$ |
|---|---|---|---|
| 125 | 0000 | 244 | 1001 |
| 126 | 0111 | 245 | 1000 |
| 127 | 1111 | 246 | 0000 |
| 130 | 1000 | 247 | 0110 |
| 131 | 1100 | 250 | 1011 |
| 132 | 1010 | 251 | 1000 |
| 133 | 0110 | 252 | 0110 |
| 134 | 0110 | 253 | 1010 |
| 135 | 0000 | 254 | 1101 |
| 136 | 1001 | 255 | 1010 |
| 137 | 1110 | 256 | 0000 |
| 140 | 1011 | 257 | 0110 |

-continued

| Meters | | | | | Yards | | | |
|---|---|---|---|---|---|---|---|---|
| Address | $O_4O_3O_2O_1$ | Address | $O_4O_3O_2O_1$ | | Address | $O_4O_3O_2O_1$ | Address | $O_4O_3O_2O_1$ |
| 141 | 1000 | 260 | 0110 | | 406 | 0110 | 515 | 1011 |
| 142 | 1111 | 261 | 1011 | | 407 | 0110 | 516 | 1000 |
| 143 | 0110 | 262 | 0110 | | 410 | 0000 | 517 | 0110 |
| 144 | 0110 | 263 | 1110 | | 411 | 1000 | 520 | 0110 |
| 145 | 0000 | 264 | 1010 | | 412 | 0111 | 521 | 0000 |
| 146 | 1100 | 265 | 1111 | | 413 | 0110 | 522 | 0110 |
| 147 | 1100 | 266 | 0110 | | 414 | 0111 | 523 | 1010 |
| 150 | 0111 | 267 | 0000 | | 415 | 0110 | 524 | 1110 |
| 151 | 1011 | 270 | 0110 | | 416 | 0110 | 525 | 0111 |
| 152 | 1110 | 271 | 0110 | | 417 | 0110 | 526 | 1011 |
| 153 | 0111 | 272 | 0111 | | 420 | 0000 | 527 | 0110 |
| 154 | 0110 | 273 | 1100 | | 421 | 1011 | 530 | 0110 |
| 155 | 0000 | 274 | 1111 | | 422 | 1000 | 531 | 0000 |
| 156 | 1000 | 275 | 1110 | | 423 | 0110 | 532 | 0110 |
| 157 | 1001 | 276 | 0111 | | 424 | 1000 | 533 | 1110 |
| 160 | 1001 | 277 | 0000 | | 425 | 0110 | 534 | 1100 |
| 161 | 0110 | 300 | 0110 | | 426 | 0110 | 535 | 1001 |
| 162 | 1101 | 301 | 0110 | | 427 | 0110 | 536 | 0110 |
| 163 | 1001 | 302 | 1000 | | 430 | 0110 | 537 | 0111 |
| 164 | 0110 | 303 | 1000 | | 431 | 0000 | 540 | 0110 |
| 165 | 0000 | 304 | 1111 | | 432 | 1011 | 541 | 0000 |
| 166 | 1010 | 305 | 1101 | | 433 | 0110 | 542 | 0110 |
| 167 | 1100 | 306 | 1001 | | 434 | 1010 | 543 | 1100 |
| 170 | 1100 | 307 | 0000 | | 435 | 0110 | 544 | 1001 |
| 171 | 0110 | 310 | 0110 | | 436 | 0110 | 545 | 1101 |
| 172 | 1010 | 311 | 0110 | | 437 | 0110 | 546 | 0110 |
| 173 | 1101 | 312 | 1010 | | 440 | 0110 | 547 | 1000 |
| 174 | 0110 | 313 | 1010 | | 441 | 0000 | 550 | 0110 |
| 175 | 0000 | 314 | 1110 | | 442 | 0110 | 551 | 0000 |
| 176 | 1110 | 315 | 1011 | | 443 | 0111 | 552 | 0110 |
| 177 | 1000 | 316 | 1101 | | 444 | 1110 | 553 | 1000 |
| 200 | 1001 | 317 | 0110 | | 445 | 0110 | 554 | 1101 |
| 201 | 0111 | 320 | 0000 | | 446 | 0110 | 555 | 1010 |
| 202 | 1110 | 321 | 0001 | | 447 | 0110 | 556 | 0111 |
| 203 | 1010 | 322 | 0001 | | 450 | 0110 | 557 | 1010 |
| 204 | 0111 | 323 | 0001 | | 451 | 0000 | 560 | 0110 |
| 205 | 0000 | 324 | 0011 | | 452 | 0110 | 561 | 0000 |
| 206 | 1100 | 325 | 0011 | | 453 | 1000 | 562 | 0110 |
| 207 | 1011 | 326 | 0011 | | 454 | 1100 | 563 | 1010 |
| 210 | 1100 | 327 | 0011 | | 455 | 0111 | 564 | 1010 |
| 211 | 1000 | 330 | 0011 | | 456 | 0110 | 565 | 1111 |
| 212 | 1100 | 331 | 0011 | | 457 | 0110 | 566 | 1000 |
| 213 | 1111 | 332 | 0011 | | 460 | 0110 | 567 | 1110 |
| 214 | 1000 | 333 | 0011 | | 461 | 0000 | 570 | 0110 |
| 215 | 0000 | 334 | 0110 | | 462 | 0110 | 571 | 0000 |
| 216 | 1000 | 335 | 0110 | | 463 | 1010 | 572 | 0001 |
| 217 | 0111 | 336 | 0110 | | 464 | 1000 | 573 | 0001 |
| 220 | 1001 | 337 | 0110 | | 465 | 1001 | 574 | 0001 |
| 221 | 1011 | 340 | 0110 | | 466 | 0110 | 575 | 0011 |
| 222 | 1000 | 341 | 0110 | | 467 | 0110 | 576 | 0011 |
| 223 | 1111 | 342 | 0110 | | 470 | 0110 | 577 | 0011 |
| 224 | 1011 | 343 | 0110 | | 471 | 0000 | 600 | 0011 |
| 225 | 0110 | 344 | 0001 | | 472 | 0110 | 601 | 0011 |
| 226 | 0000 | 345 | 0001 | | 473 | 1110 | 602 | 0011 |
| 227 | 1000 | 346 | 0001 | | 474 | 1010 | 603 | 0011 |
| 230 | 1100 | 347 | 0010 | | 475 | 1100 | 604 | 0011 |
| 231 | 0110 | 350 | 0010 | | 476 | 0110 | 605 | 0001 |
| 232 | 1011 | 351 | 0010 | | 477 | 0110 | 606 | 0110 |
| 233 | 1110 | 352 | 0100 | | 500 | 0110 | 607 | 0110 |
| 234 | 0111 | 353 | 0100 | | 501 | 0000 | 610 | 0110 |
| 235 | 0111 | 354 | 0100 | | 502 | 0110 | 611 | 0110 |
| 236 | 0000 | 355 | 0110 | | 503 | 1100 | 612 | 0110 |
| 237 | 1011 | 356 | 0110 | | 504 | 1111 | 613 | 0110 |
| 240 | 1000 | 357 | 0110 | | 505 | 1000 | 614 | 0110 |
| 241 | 0111 | 360 | 0110 | | 506 | 0111 | 615 | 0101 |
| 242 | 0110 | 361 | 0101 | | | | | |
| 243 | 1101 | | | | | | | |

| Yards | | | |
|---|---|---|---|
| Address | $O_4O_3O_2O_1$ | Address | $O_4O_3O_2O_1$ |
| 400 | 0000 | 507 | 0110 |
| 401 | 1100 | 510 | 0110 |
| 402 | 0110 | 511 | 0000 |
| 403 | 1011 | 512 | 0110 |
| 404 | 0110 | 513 | 1000 |
| 405 | 0110 | 514 | 1111 |

APPENDIX II
PARTS LIST

| Reference No. | Type |
|---|---|
| Resistors | |
| 240, 242 | 33kΩ |
| 241, 243 | 100Ω |
| 244, 245 | 680Ω, ½ watt |
| 410 | 1000Ω |
| 412, 413 | 4700Ω |

-continued
APPENDIX II
PARTS LIST

| Reference No. | Type |
|---|---|
| 427 | 150Ω |
| 428 | 300Ω |
| 464 | 200Ω |
| 465, 492 | 390Ω |
| 491 | 2200Ω |
| 494 | 750Ω |
| 496 | 1200Ω |
| 499 | 1500Ω |
| 501 | 1000Ω, 1 watt |
| Transistors | |
| 246, 247 | 2N2222A |
| 490 | 2N2907A |
| 495 | 2N2219 |
| Capacitors | |
| 411 | 0.05 μfd. |
| 493, 498 | 15 μfd. |
| Integrated Circuits | |
| 402, 404, 434–437 | SN74164 |
| 406, 408, 452–455 | SN74174 |
| 414, 430, 460, 488 | SN7402 |
| 415, 429, 439, 440–442, 444, 448 | SN7486 |
| 416, 421, 426, 445, 450, 457, 468, 470, 476, 479, 480 | SN7404 |
| 417–420 | SN7408 |
| 422, 423 | SN74H11 |
| 424 | SN74148 |
| 425, 431–433, 466, 467, 482, 487 | SN74163 |
| 438 | SN74298 |
| 446, 447, 451, 456, 459, 474, 477, 478 | SN7400 |
| 458, 472, 473, 475, 481, 486 | SN7410 |
| 461 | SN74146 |
| 462 | SN7448 |
| 469 | SN74S138 |
| 471 | MM16306 |

Note:
All resistors are ¼ watt 5% unless otherwise specified; SN designation integrated circuits are Texas Instruments, Inc. types; MMI designation integrated circuit is Monolithic Memories Incorporated type.

What is claimed is:

1. A device for producing signals representing the position on a display screen of a variable position range mark comprising in combination:
   an encoder wheel, said encoder wheel having a cylindrically shaped peripheral portion and an end cap portion, said cylindrically shaped peripheral portion having a plurality of longitudinal slots therein;
   a shaft for rotating said encoder wheel, said shaft being coupled to the outer portion of said end cap;
   first and second light emitting means positioned adjacent the outer surface of said peripheral portion of said encoder wheel;
   first and second means for producing first and second electrical signals in response to light, said first and second electrical signal producing means being positioned inside said peripheral portion of said encoder wheel axially opposite said first and second light producing means, said first and second electrical signal producing means being positioned in relation to said slots such that said first and second signals are produced out of phase with one another as said encoder wheel is rotated;
   means for providing a visual display in response to radar return signals, said visual display having a plurality of radar range scale settings;
   means for producing a range mark signal for displaying a range mark on said visual display, the displayed position of said range mark being determined by said first and second signals; and
   said producing means comprising means for maintaining the distance of movement of said range mark on said visual display for a predetermined amount of rotation of said encoder wheel constant for a plurality of said radar range scale settings.

2. The combination of claim 1 wherein:
   said first signal is advanced in phase from said second signal for a first direction of rotation and retarded in phase from said second signal for the opposite direction of rotation.

3. The combination of claim 2 wherein:
   said first and second electrical signal producing means are positioned at substantially a forty-five degree angle from the longitudinal axis of said encoder wheel.

4. The combination of claim 2 wherein said first and second electrical signal producing means each comprise:
   a phototransistor.

5. The combination of claim 2 wherein said light-producing means each comprise:
   a light-emitting diode.

6. The combination of claim 2 wherein:
   the number of said slots is twice an odd integer.

7. The combination of claim 4 wherein said phototransistor comprises:
   a D'arlington pair phototransistor.

8. The combination of claim 4 further comprising:
   amplifying means coupled to said phototransistor.

9. A device for producing signals representing the position on a display screen of a variable position range mark comprising in combination:
   an encoder wheel, said encoder wheel having a cylindrically shaped peripheral portion having a plurality of longitudinal slots therein;
   a shaft for rotating said encoder wheel, said shaft being coupled to the center portion of said end cap;
   first and second light-emitting diodes positioned adjacent the outer surface of said peripheral portion of said encoder wheel;
   first and second phototransistors for producing first and second electrical signals, said phototransistors being positioned inside said peripheral portion of said encoder wheel axially opposite said first and second light-emitting diodes respectively, said phototransistors being positioned in relation to said slots such that said first and second electrical signals are produced out of phase with one another as said encoder wheel is rotated, said first signal being advanced in phase from said second signal for a first direction of rotation and retarded in phase from said second electrical signal for the opposite direction of rotation;
   means for providing a visual display in response to radar return signals, said visual display having a plurality of radar range scale settings;
   means for producing a range mark signal for displaying a range mark on said visual display, the displayed position of said range mark being determined by said first and second signals;
   said producing means comprising means for maintaining the distance of movement of said range mark on said visual display for a predetermined amount of rotation of said encoder wheel constant for a plurality of said radar range scale settings;
   said maintaining means comprising means for storing a digital count produced in response to said electrical signals, said count increasing for one direction of rotation and decreasing for the opposite direction of rotation of said encoder wheel; and means for positioning said count in said storing means as a function of said radar range scale setting.

10. The combination of claim 9 wherein said count producing means comprises:
a shift register;
means for adding to or subtracting from the value of a number stored in said shift register in response to said first and second electrical signals.

11. The combination of claim 9 wherein: said phototransistors are positioned at substantially a forty-five degree angle relative to the longitudinal axis of said encoder wheel.

12. The combination of claim 9 wherein: said shaft and said encoder wheel are formed from the same body of solid material.

13. The combination of claim 9 wherein: said shaft and said encoder wheel are formed as a continuous plastic body.

14. The combination of claim 9 wherein: the width of said slots is approximately the same as the distance between said slots.

15. The combination of claim 11 wherein: the number of said slots is twice an odd number.

* * * * *